US009463675B2

(12) United States Patent
Korhonen et al.

(10) Patent No.: US 9,463,675 B2
(45) Date of Patent: Oct. 11, 2016

(54) DOLLY

(71) Applicant: K. Hartwall Oy Ab, Söderkulla (FI)

(72) Inventors: Eero Korhonen, Söderkulla (FI); Jack Gronholm, Söderkulla (FI); Petri Piirainen, Söderkulla (FI); Juha Makela, Söderkulla (FI)

(73) Assignee: K. Hartwall Oy Ab, Söderkulla (FI)

( * ) Notice: Subject to any disclaimer, the term of this patent is extended or adjusted under 35 U.S.C. 154(b) by 0 days.

(21) Appl. No.: 14/205,056

(22) Filed: Mar. 11, 2014

(65) Prior Publication Data

US 2014/0265241 A1    Sep. 18, 2014

(30) Foreign Application Priority Data

Mar. 15, 2013   (EP) ..................................... 13159415

(51) Int. Cl.
*B60D 1/54*   (2006.01)
*B60D 1/155*   (2006.01)
*B60D 1/14*   (2006.01)
*B60D 1/48*   (2006.01)
(Continued)

(52) U.S. Cl.
CPC .................. *B60D 1/54* (2013.01); *B60D 1/143* (2013.01); *B60D 1/481* (2013.01); *B62B 5/067* (2013.01); *B62D 63/08* (2013.01); *B62B 3/1476* (2013.01); *B62B 2207/00* (2013.01)

(58) Field of Classification Search
CPC ........ B60D 1/54; B60D 1/143; B60D 1/145; B60D 1/155; B60D 1/481; B62D 63/08; B62B 5/067

USPC ...... 280/408, 410, 416.1, 489, 491.1, 491.2, 280/491.3, 47.371, 514, 515, 651, 655.1
See application file for complete search history.

(56) References Cited

U.S. PATENT DOCUMENTS

| 2,469,242 A | 5/1949 | Pohl |
| 4,351,541 A * | 9/1982 | Propst et al. ................. 280/408 |

(Continued)

FOREIGN PATENT DOCUMENTS

| FR | 2787756 A1 | 6/2000 |
| GB | 1221358 A | 2/1971 |

(Continued)

OTHER PUBLICATIONS

European Search Report, dated Sep. 5, 2013, European Patent App. No. 13159415, K. Hartwall Oy Ab, 2 pgs.
(Continued)

*Primary Examiner* — Anne Marie Boehler
(74) *Attorney, Agent, or Firm* — Chernoff, Vilhauer, McClung & Stenzel, LLP

(57) ABSTRACT

The present invention provides an improved dolly which is not only effective in terms of return logistics but also simple in design and easy to use. The novel dolly includes a chassis, which has an upper side with a load carrying surface, and an opposing underside. The dolly also includes a tow bar, which is arranged slidably to the underside of the chassis via a pivoting mechanism, which is configured to pivot the tow bar about a horizontal axis. The chassis of the dolly includes a corresponding hitch, which allows pivoting action about a vertical axis between the tow bar and the hitch.

14 Claims, 13 Drawing Sheets

(51) Int. Cl.
  *B62D 63/08* (2006.01)
  *B62B 5/06* (2006.01)
  *B62B 3/14* (2006.01)

(56) References Cited

U.S. PATENT DOCUMENTS

| | | | |
|---|---|---|---|
| 4,887,836 A | 12/1989 | Simjian | |
| 7,011,329 B2 * | 3/2006 | Yoder | 280/493 |
| 7,462,009 B2 * | 12/2008 | Hartmann et al. | 414/434 |
| 2006/0220334 A1 * | 10/2006 | Liao | 280/47.34 |
| 2007/0108727 A1 * | 5/2007 | Leverett | 280/408 |
| 2013/0241177 A1 * | 9/2013 | Tiilikainen et al. | 280/408 |

FOREIGN PATENT DOCUMENTS

| | | |
|---|---|---|
| JP | S60501801 A | 10/1985 |
| JP | 2005119521 A | 5/2005 |
| WO | 8500329 A1 | 1/1985 |
| WO | 2006060303 A2 | 6/2006 |
| WO | 2012072856 A1 | 6/2012 |

OTHER PUBLICATIONS

State Intellectual Propery Office of the Peoples Republic of China, First Office Action issued in application No. 201410094244.0, Nov. 30, 2015, 6 pages, SIPO, Beijing, China.

* cited by examiner

DOLLY

CROSS-REFERENCE TO RELATED APPLICATIONS

This application claims priority under 35 U.S.C. §119 to European Patent Application No. 13159415.2, filed Mar. 15, 2013.

BACKGROUND

The present invention relates to transporting goods. In particular, the invention relates to dollies, on which parceled goods are transported and stored temporarily. To be precise, the invention relates to a dolly according to the preamble portion of claims.

There is known a vast variety of different devices used for transporting parceled goods. Typically pieces or stacks thereof are loaded onto a wheeled platform, on which they are conveyed to shop floor or storage. These wheeled platforms are called dollies. Some dollies are equipped with a tow bar and a corresponding hitch for transporting a plurality of dollies in a chained fashion. When the tow bar for pulling the dolly is temporarily not used, it is typically pivoted in an upright position for saving space. U.S. Pat. No. 4,856,810 proposes one solution to providing a space saving tow bar for a dolly.

Conventional pivoting tow bars, however, occupy valuable space, when the dolly is in transit, for example. When the dolly is loaded onto a trailer such that the tow bar is not used for a long period of time, the folded tow bar uses excess space. This problem has previously been solved by providing couplings between the dolly and the tow bar, whereby the tow bar may be detached for transit. Detachable tow bars, on the other hand, are un-ideal for the reason that the detached tow bars must be handled separately and the coupling typically increases the complexity of the device and therefore reduces its robustness and user-friendliness required for logistics equipment.

It is therefore an aim of the present invention to provide an improved dolly which is not only effective in terms of return logistics but also simple in design and easy to use.

SUMMARY

The aim of the present invention is achieved with aid of a novel dolly for transporting items loaded thereon. The dolly includes a chassis which has an upper side with a load carrying surface, and an opposing underside. The dolly also includes a tow bar which is arranged slidably to the underside of the chassis via a pivoting mechanism which is configured to pivot the tow bar about a horizontal axis. The chassis of the dolly includes a corresponding hitch, which allows pivoting action about a vertical axis between the tow bar and the hitch.

Considerable benefits are gained with aid of the present invention.

By virtue of the slidable and pivotable connection between the tow bar and the chassis of the dolly, the tow bar may not only be guided to a towing and parking positions, the tow bar may also be guided to a retracted position. In the retracted position the tow bar is completely retracted under the load carrying surface of the dolly, wherein the external dimensions of the dolly are minimized for individual transport and storage of the dolly.

Other objects and features of the invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE SEVERAL VIEWS OF THE DRAWINGS

In the following, exemplary embodiments of the invention are described in greater detail with reference to the accompanying drawings in which.

DETAILED DESCRIPTION

Figure 1:
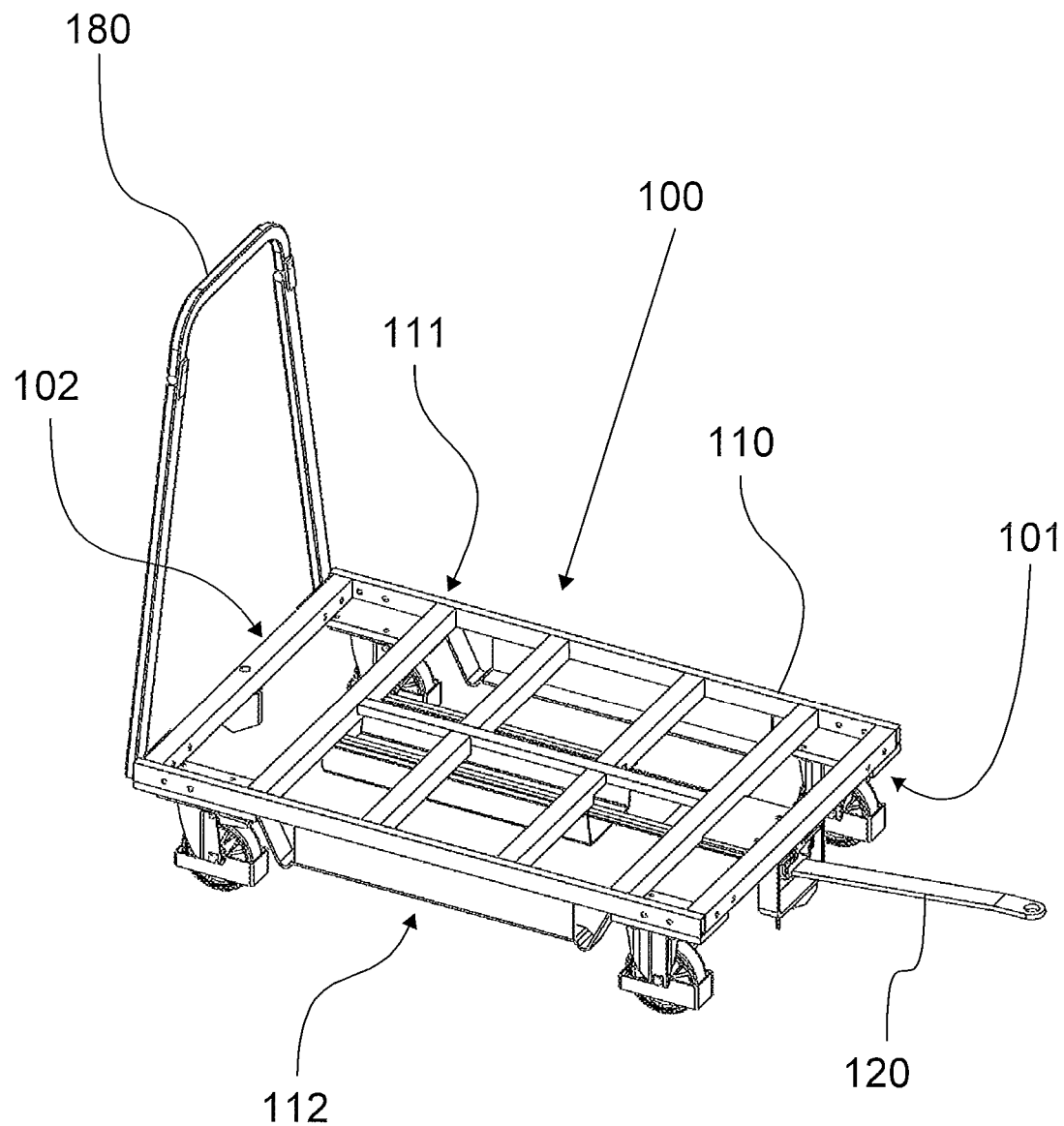
FIG. 1 presents an upper isometric view of a dolly with a tow bar in a towing position according to one embodiment.

The tow bar 120 of the dolly 100 according to the illustrated example may be guided into three main attitudes. In this context the term dolly is meant to refer to a cart-like dolly as described in engineering standard EN 12674-1. FIGS. 1, 3 and 6 to 10 show the tow bar 120 in a substantially horizontal towing position, where the tow bar 120 is arranged to the first end 101 of the dolly 100 to be engaged with a hitch 190 of a towing dolly or tractor (cf. FIG. 13). The dolly 100 as shown in the Figures may be an intermediate link in a chain of dollies 100, but it may also serve as a tractor, wherein the handle 180 may be used to haul the combination of dollies. The handle 180 has substantially the shape of the letter A, wherein joints has been provided in the top region of the handle 180 for turning the top end of the handle 180 horizontally thus creating a gripping clearance for hands.

Figure 5:
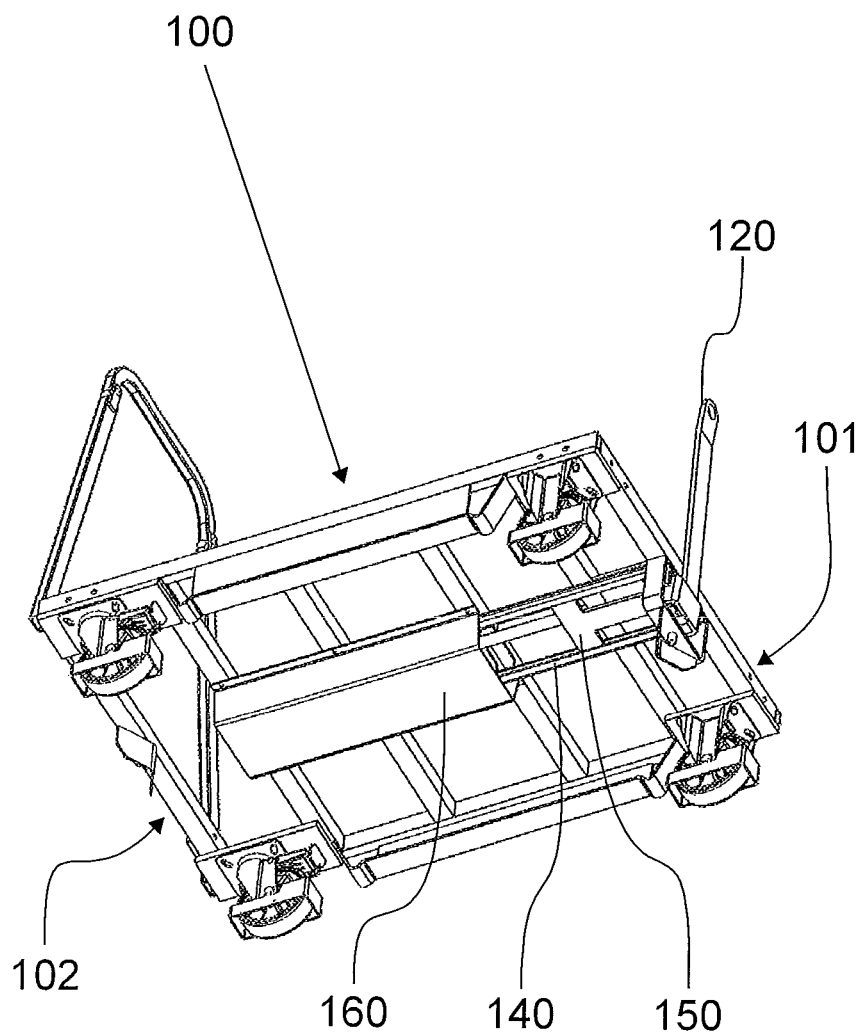
FIG. 5 presents a lower isometric view of the dolly of FIG. 1 with the tow bar raised to an upright position.
Figure 6:
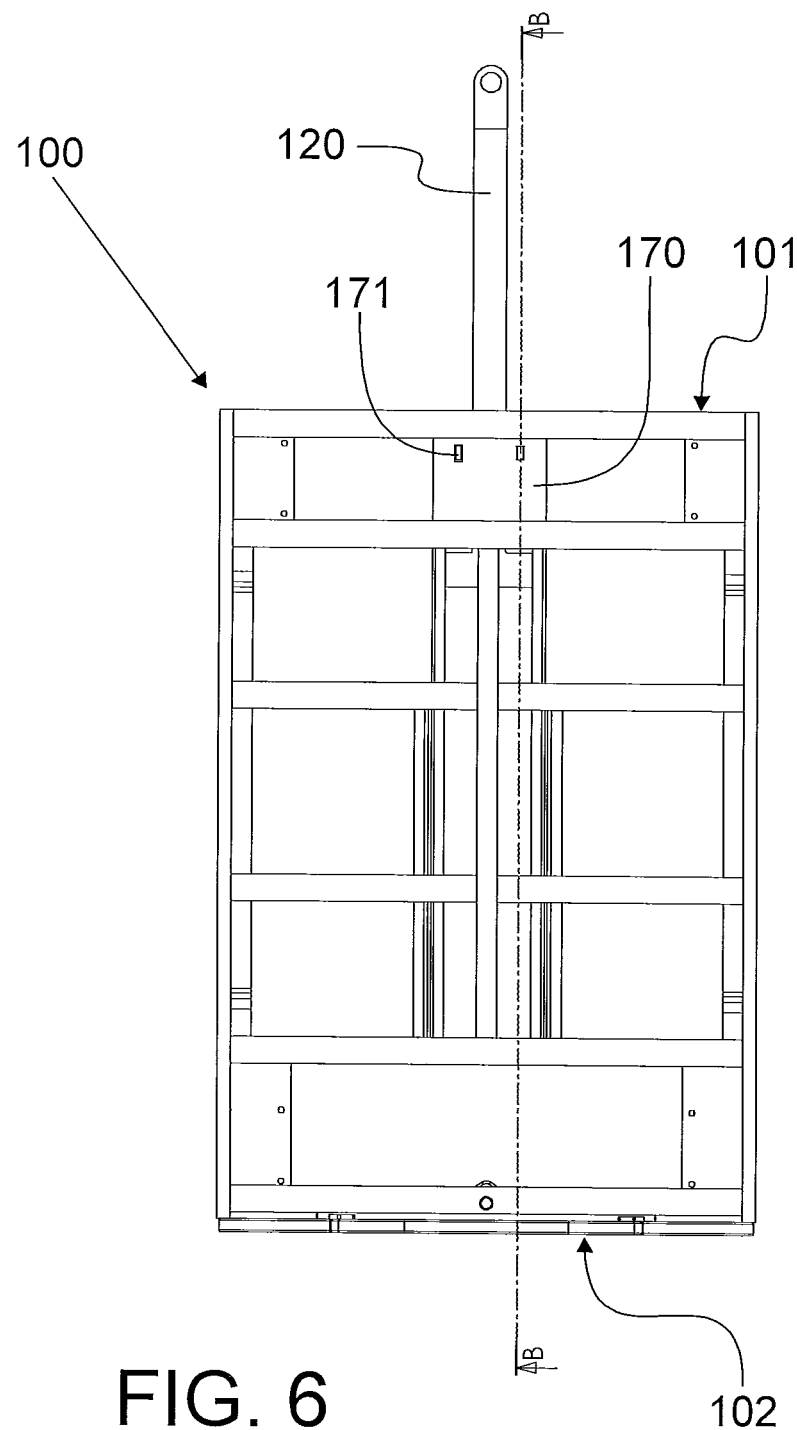
FIG. 6 presents a top elevation view of the dolly of FIG. 1.
Figure 7:
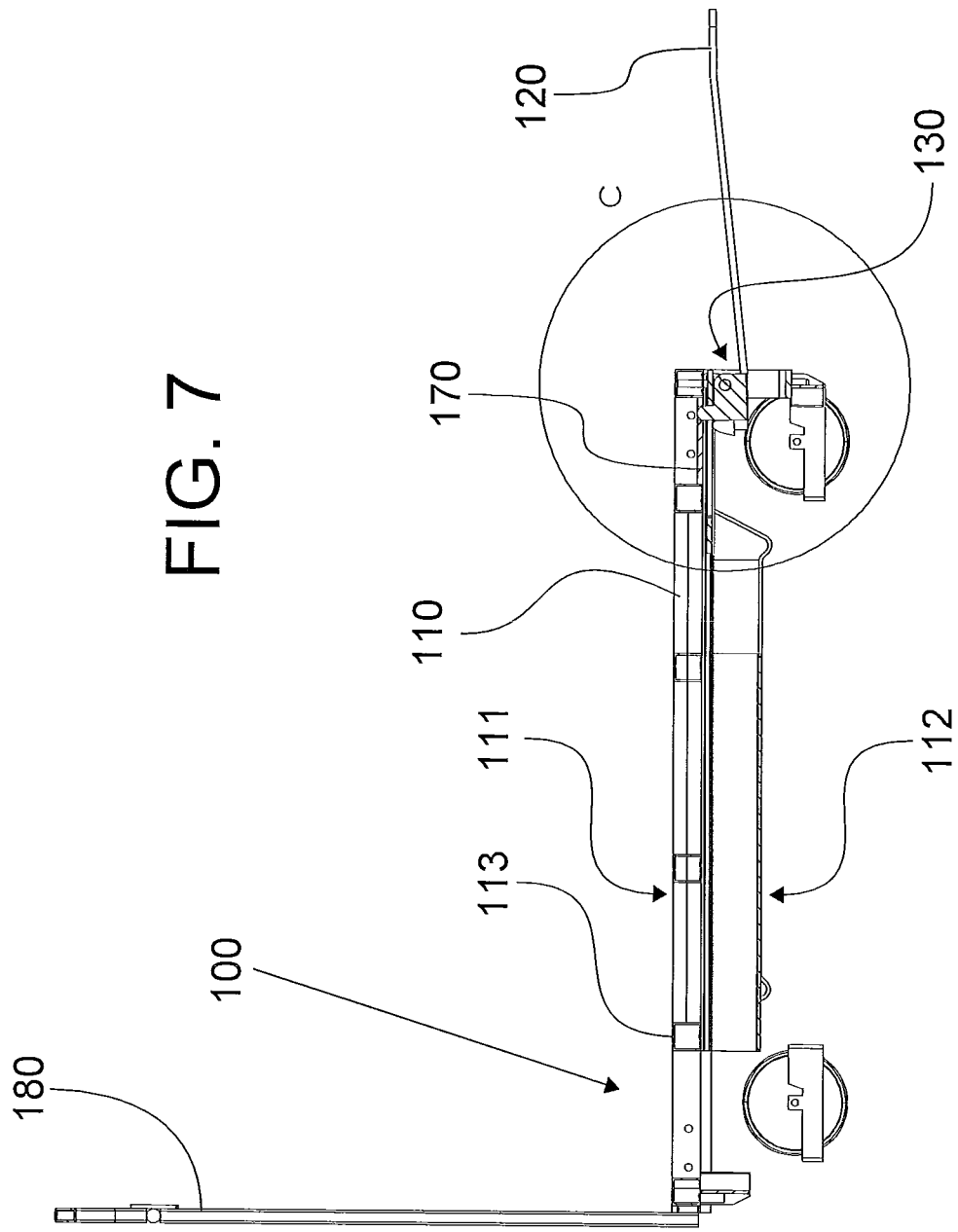
FIG. 7 presents a cross-sectional view taken along the line B-B of FIG. 6.
Figure 8:
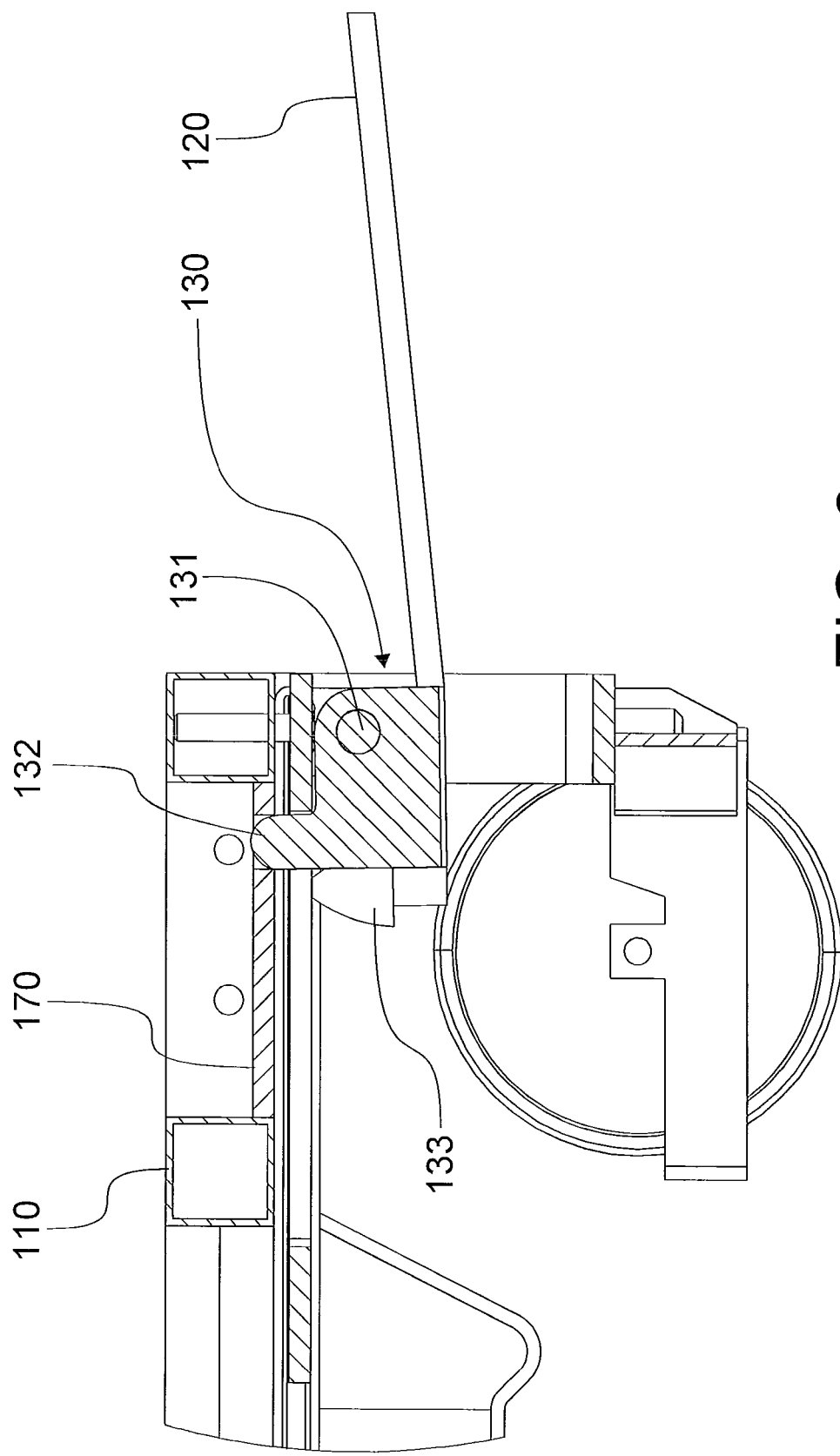
FIG. 8 presents a detail view of area C of FIG. 7.
Figure 9:
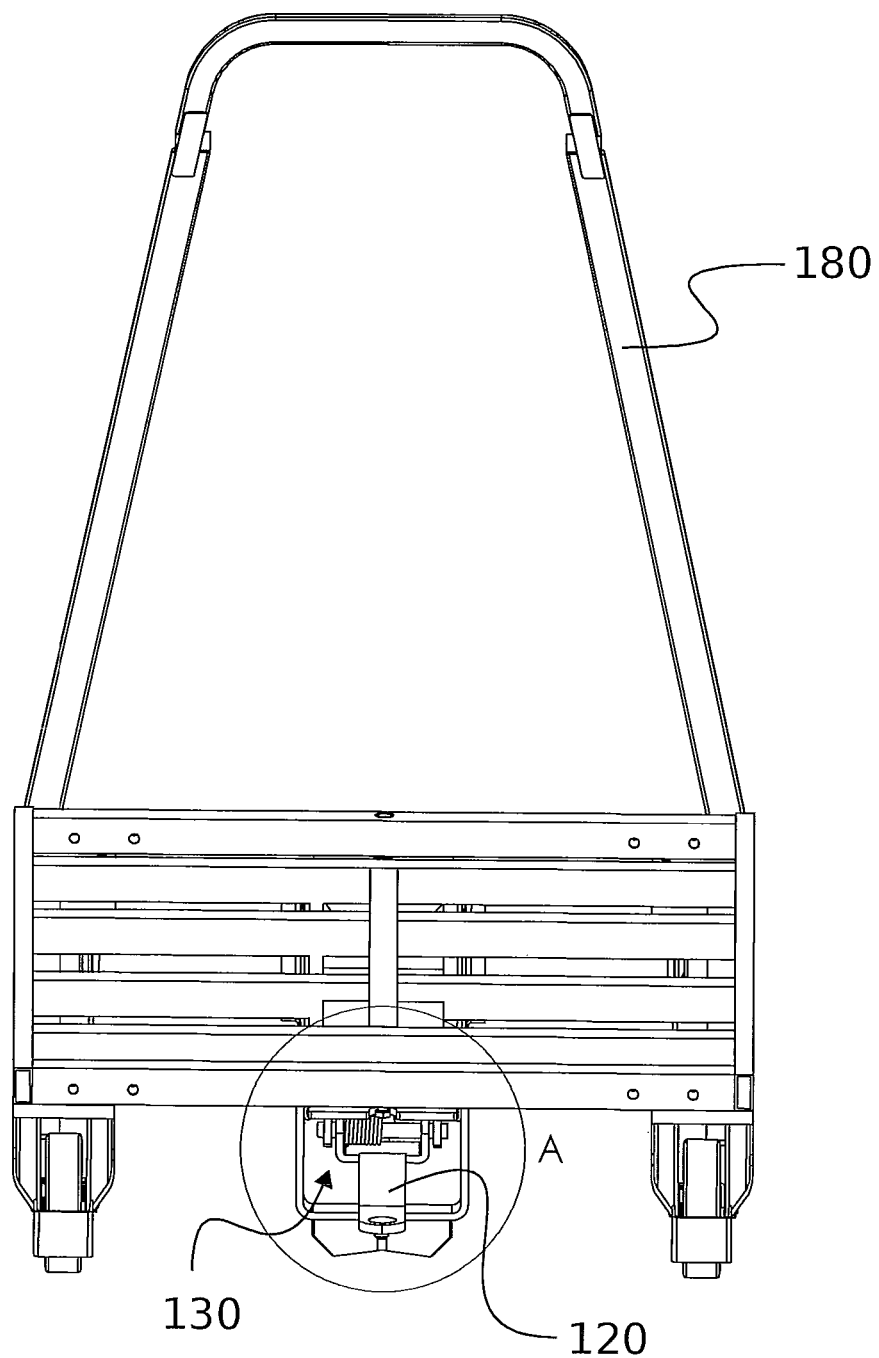
FIG. 9 presents an elevated frontal view of the dolly of FIG. 1.
Figure 11:
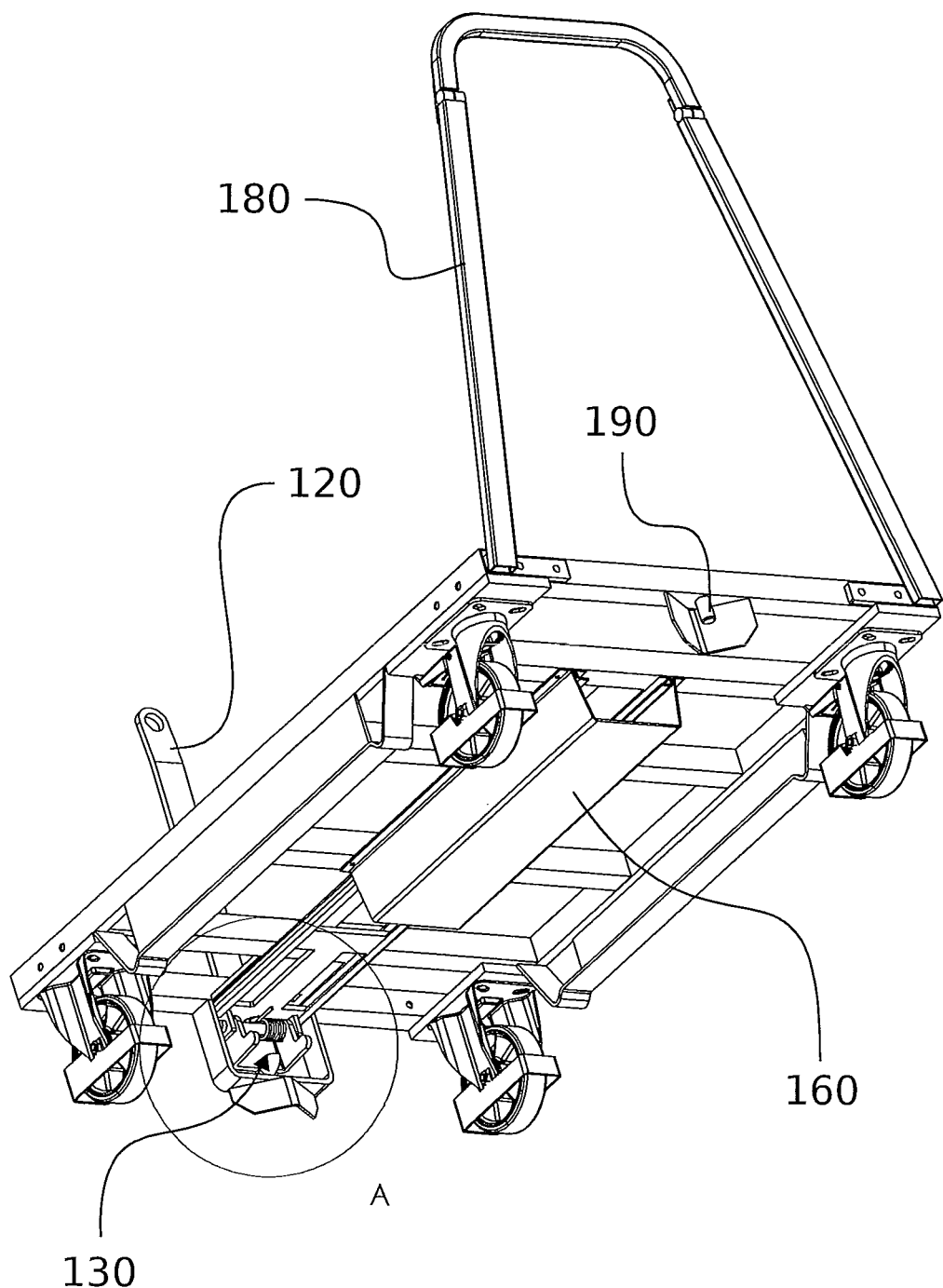
FIG. 11 presents a rear bottom isometric view of the dolly of FIG. 5.
Figure 12:
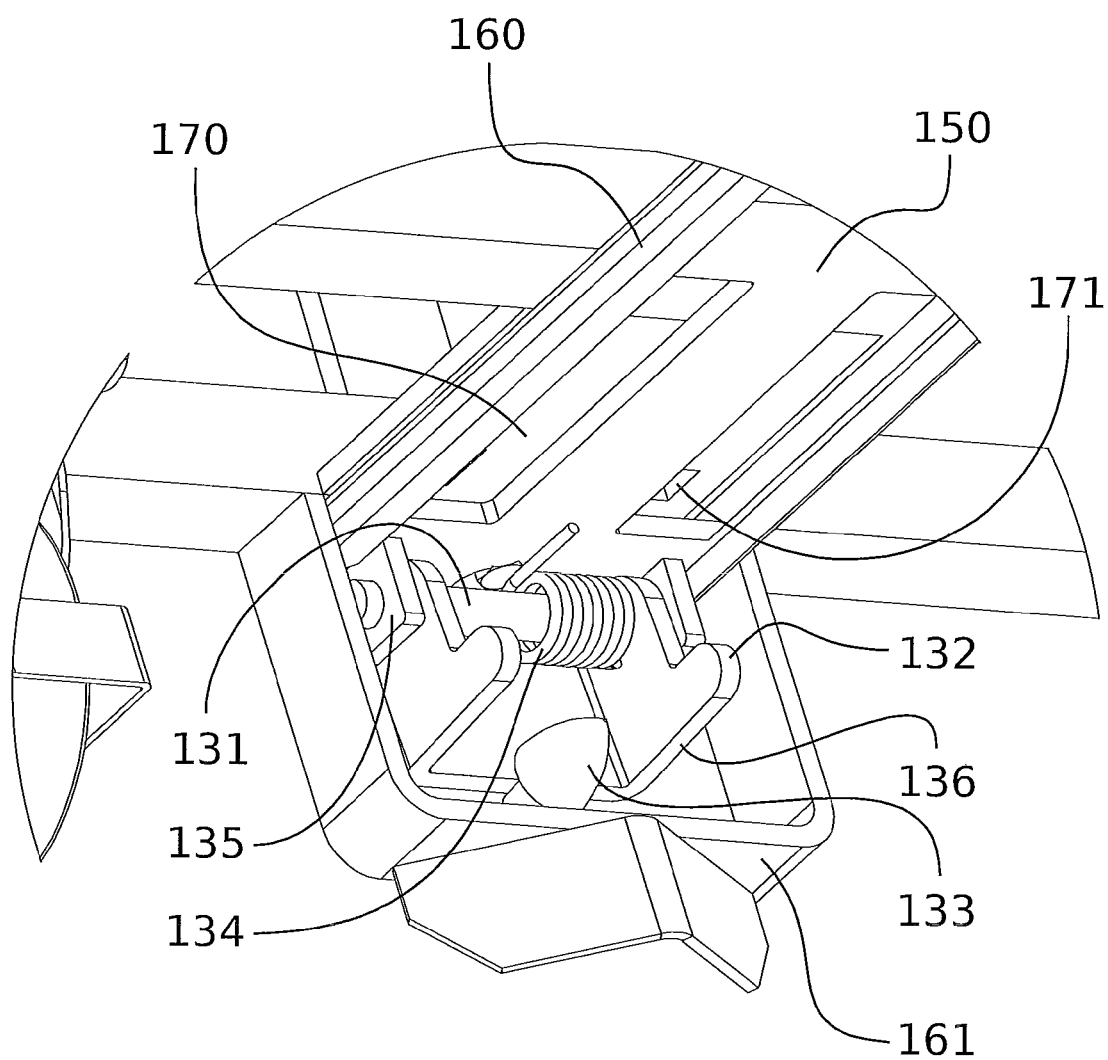
FIG. 12 presents a detail view of the pivoting mechanism denoted A in FIG. 11.

FIGS. 5, 11 and 12 show the tow bar 120 in a substantially vertical position, where the tow bar 120 is arranged to the same first end of the dolly 100 but pivoted in an upright parking position. The parking position is used for short-term storage of the dolly 100, whereby the tow bar 120 is turned into the vertical orientation for mainly safety purposes but also to save space.

Figure 2:
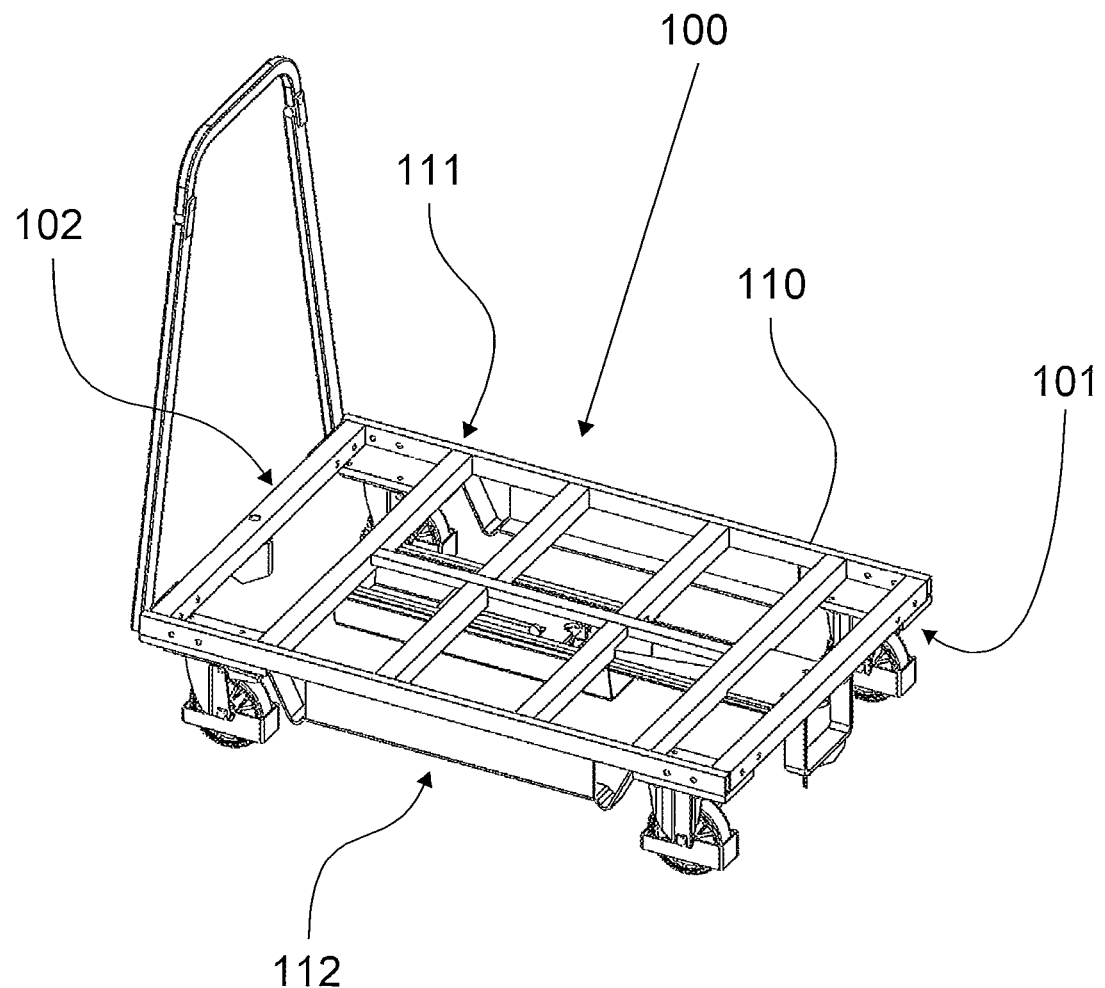
FIG. 2 presents an upper isometric view of the dolly of FIG. 1 with the tow bar in a retracted position.
Figure 3:
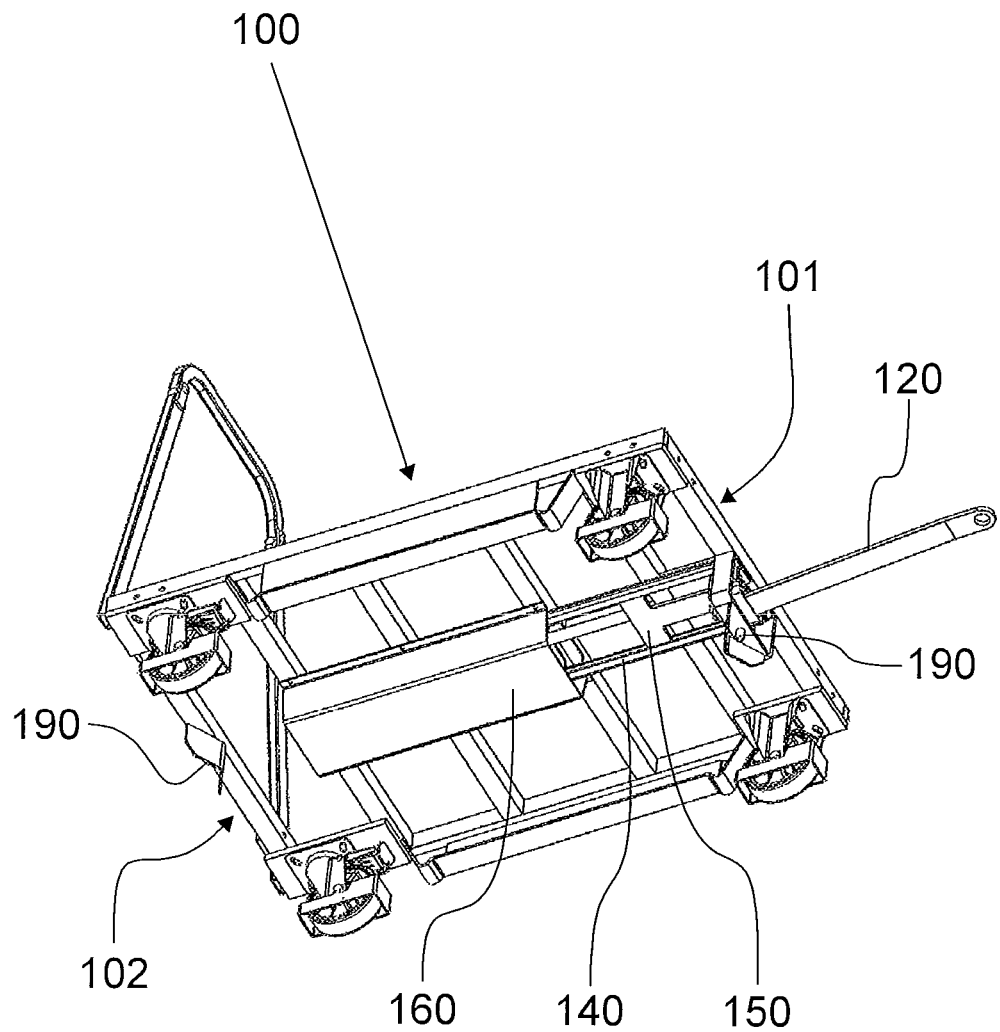
FIG. 3 presents a lower isometric view of the dolly of FIG. 1.
Figure 4:
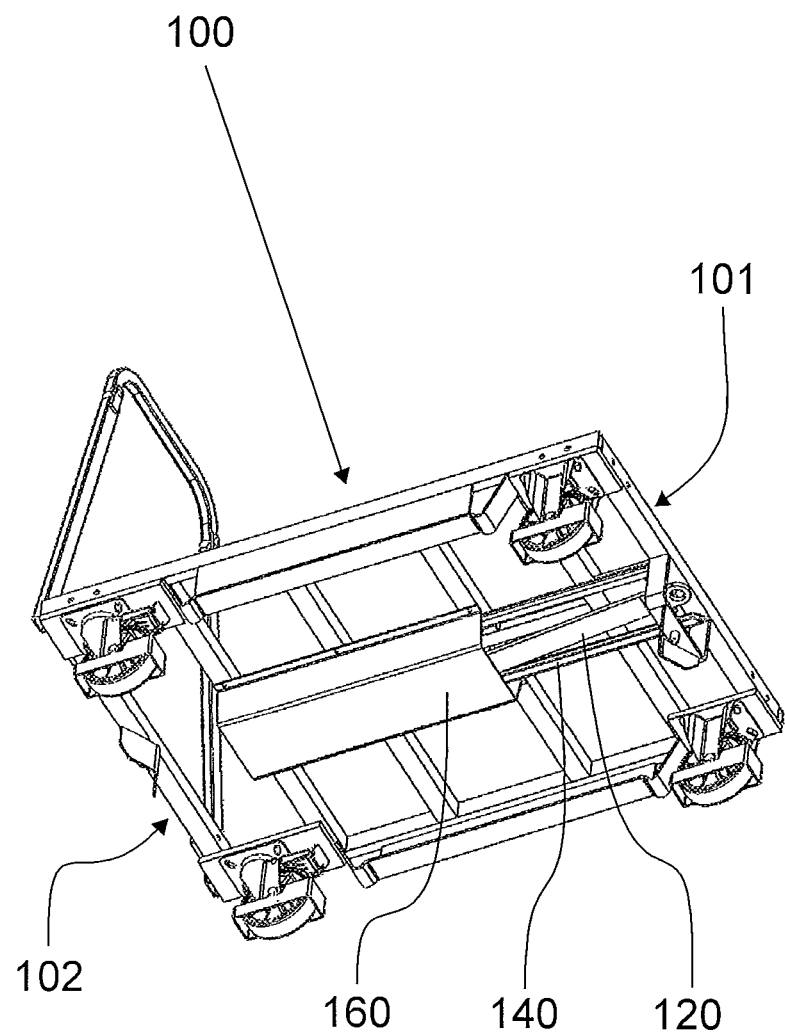
FIG. 4 presents a lower isometric view of the dolly of FIG. 2.

FIGS. 2 and 4 show the tow bar 120 in a retracted position, where the tow bar 120 is retracted from the first end 101 towards the opposing second end 102. When in the retracted position, the tow bar 120 does not occupy the space in front of the first end 101 of the dolly 100 thereby saving crucial centimeters in the external dimensions of the dolly 100. The retracted position is especially advantageous when dollies 100 are transported individually, i.e. not coupled to each other, in a trailer for example. As compared to the parking position, the tow bar 120 and the pivoting mechanism 130 are completely removed from the first end 101 of the dolly 100 resulting in the desired saving in the outer dimensions of the dolly 100.

Next, the construction according to one embodiment which enables this function is discussed in greater detail.

As is the case with conventional dollies, the dolly 100 according the illustrated embodiment features a chassis 100 with a load carrying surface 113 for receiving said items. The load carrying surface 113 is considered to define the upper side 111 of the chassis 100, whereas the castors and such are arranged to the opposing underside 112 of the chassis 100. In the illustrated example, the load carrying surface 113 is uncovered, but according to an alternative embodiment, the load carrying surface 113 may have a veneer cover, a crate or similar tray for the loaded items. When the tow bar 120 is in the retracted position, it is covered by said load carrying surface 113.

As best shown in FIGS. 3 to 5 and 11, the dolly 100 includes a guide track 140 which is provided to the underside 112 of the dolly 100. The guide track 140 runs in the main traveling direction of the dolly 100, i.e. between the first and second end 101, 102 of the dolly thus connecting the front and rear of the dolly 100. In the illustrated example, the guide track 140 is formed of two opposing profiles which are arranged at a distance from one another. The profiles of the guide track 140 are therefore separated by a distance which extends in the orthogonal horizontal direction in respect to the main traveling direction of the dolly 100. The profiles of the guide track 140 exhibit a cross-section which have substantially the shape of the letter C. A portion of the guide track 140 nearest to the second end 102 of the dolly 100 is protected by a shield 160, which is fixed to the underside 112 of the chassis 100.

The guide track 140 provides a running path for a tow bar assembly including the tow bar 120 as well as a guide block 150, which is arranged to run in the guide track 140, and a pivoting mechanism 130 which connects the tow bar 120 to the guide block 150 in a pivoting manner. Generally speaking, tow bar 120 is arranged slidably to the underside 112 of the chassis 110 via the pivoting mechanism 130 which, on the other hand, is configured to pivot the tow bar 120 about a horizontal axis. More precisely, the pivoting mechanism 130 is configured to be moved along the guide track 140 via the guide block 150 which is arranged slidably to the guide track 140, namely between the two opposing profiles of the guide track 140. The guide block 150 extends along the main traveling direction of the dolly 100, i.e. along the guide track 140, which has a stabilizing effect on the movement of the tow bar assembly. The guide block 150 according to the illustrated embodiment has been lightened to resemble the letter H for weight saving reasons. The function of the cooperation of the guide block 150 and guide track 140 is therefore to provide a stabile sliding connection between the tow bar 120 and the chassis 110 of the dolly 100. While the guide block 150 is designed to remain in a fixed angular position in respect to the vertical axis, the angular movement between consecutive dollies 100 is provided between rotation between the hitch coupling 121 of the tow bar and the cooperating hitch 190.

According to an alternative embodiment (not shown), the guide is formed by means of a unitary profile shaped such as to receive the tow bar 120 in a similar sliding manner as the illustrated embodiment. In said alternative embodiment, the top of the profile is shaped to be attached to the underside of the dolly, wherein the inner surface of the profile is shaped to receive the guide block. Therefore the inner surface of the profile is adapted to receive the guide block in a sliding manner and the outer surface of the profile is adapted to provide a protective enclosure for the tow bar assembly including the tow bar, pivoting mechanism and the guide block.

Turning now to FIGS. 3, 5 and 7 to 12 which illustrate the construction and function of pivoting mechanism 130 connecting the tow bar 120 to the guide block 150 in a hinge-like manner. Fixed to the under surface of the guide block 150 are two distanced axle brackets 135 having aligned openings through which an axle 131 has been arranged to connect the brackets 135 in a horizontal direction transversal to the main traveling direction of the dolly 100. The axle 131 therefore forms the axis of revolution of the tow bar 120. A protective profile 161 is provided to the first end 101 of the dolly 100 to cover the pivoting mechanism 130 and to act as a fixing point for a hitch 190.

On the axle 131 a swing member 136 has been provided in a rotatable manner. The swing member 136 is connected to the tow bar 120 such that the tow bar 120 extends from the swing member 136 so as to allow the tow bar 120 to be pivoted about the axle 131. The swing member 136 has a shape resembling the letter C, wherein the distal ends of the member feature male locking pieces 132 which are adapted to lock into to receptive openings 171 of a locking plate 170 which is provided to the first end 101 of the dolly 100 on top of the guide track 140. Alternatively, the receptive openings 171 may be provided to beams or other structures making up the chassis 110 of the dolly 100. The male locking pieces 132 are protuberances extending from the swing member 136 and form the male pieces of the locking interface between the swing member 136 and the locking plate 170 whose receptive openings 171 form the female counterpart in the locking interface. The swing member 136 is shown in the vertical position in FIGS. 11 and 12, wherein the tow bar 120 is in a vertical, i.e. upright position. When the tow bar 120 is pivoted into the horizontal towing position, the swing bar 136 is similarly rotated about the axle 131 into the horizontal position, wherein the male pieces 132 engage with the openings 171 of the locking plate 170. In this configuration, the locking interface 132, 171 between the swing member 136 and the locking plate 170 ensure that the tow bar 120 does not slide backwards into the retracted position (cf. FIG. 4).

Figure 10:
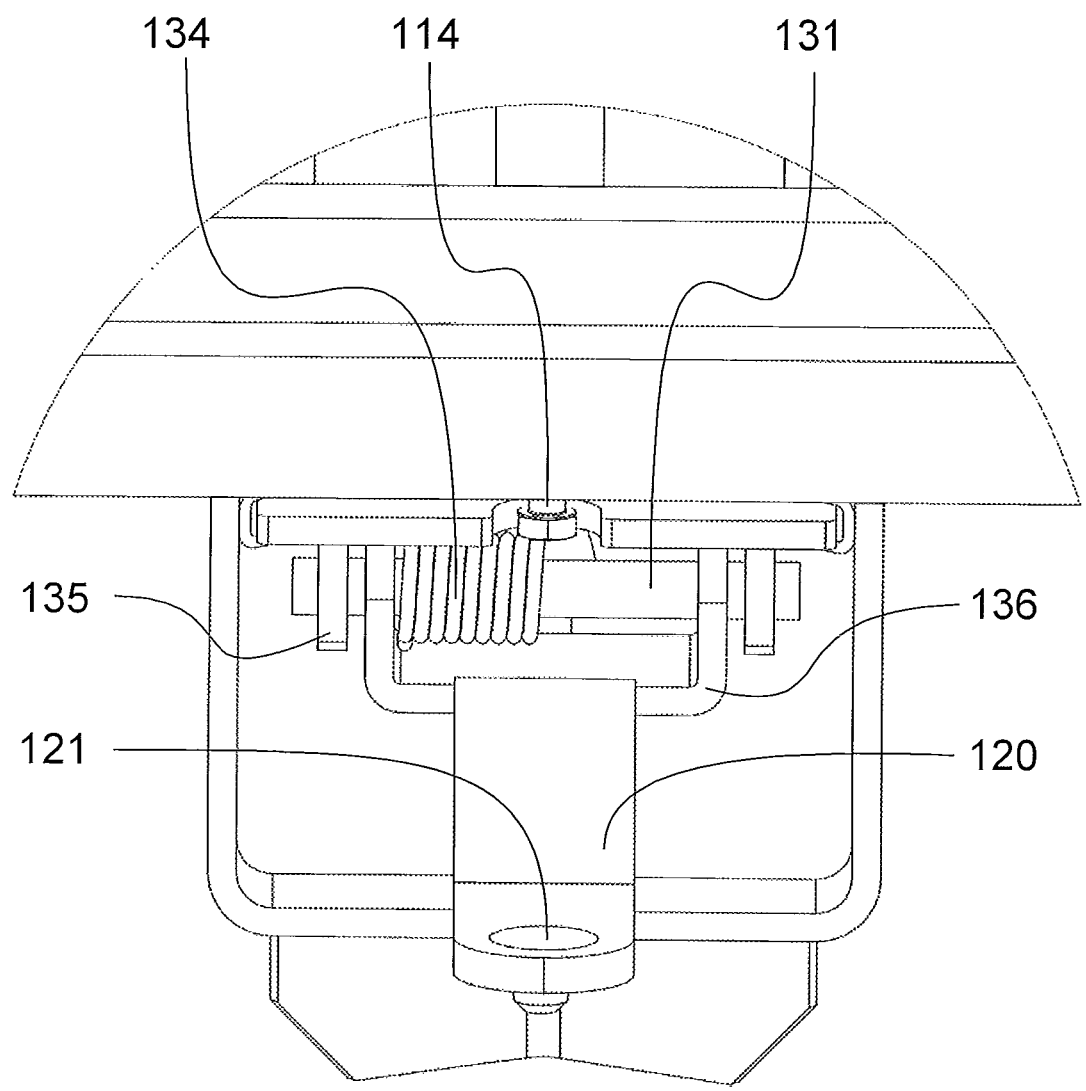
FIG. 10 presents a detail view of the pivoting mechanism denoted A in FIG. 9.
Figure 13:
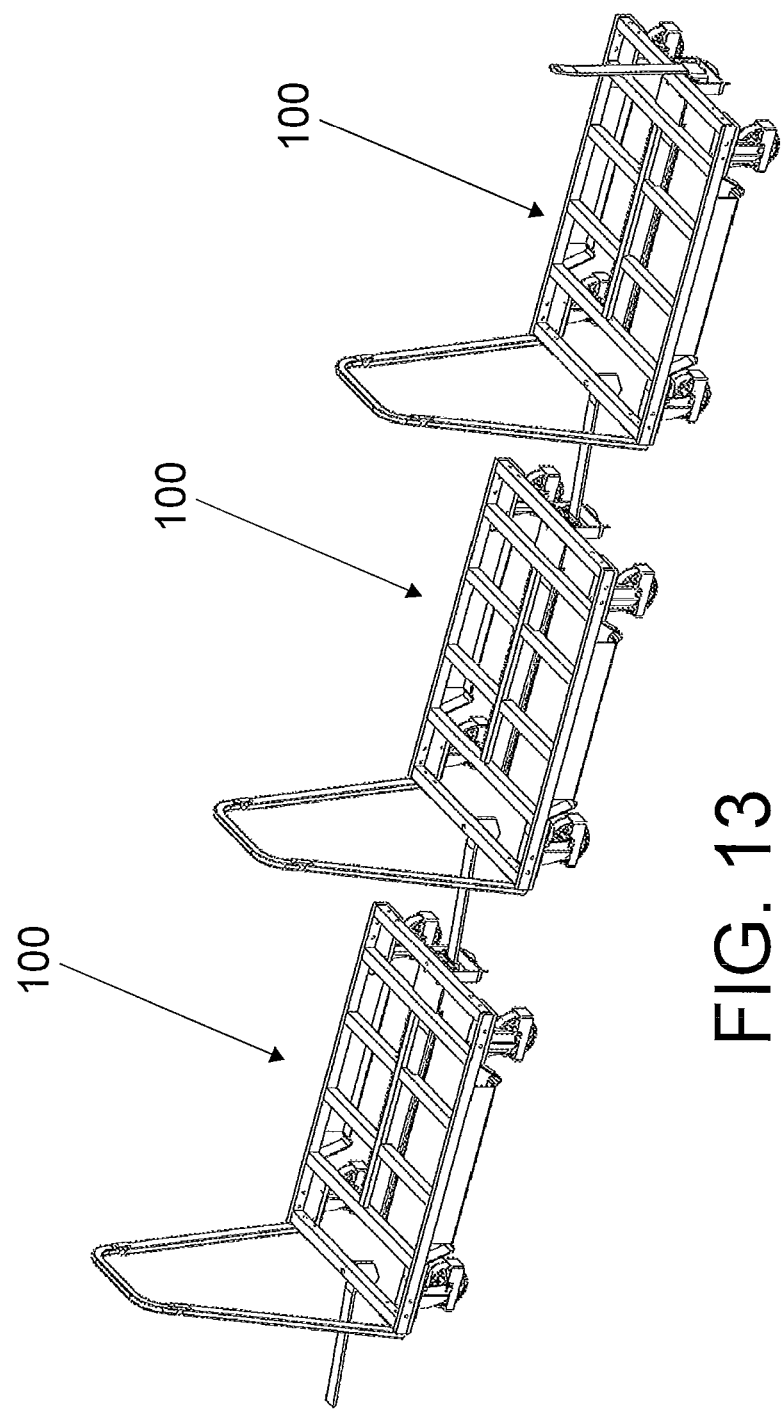
FIG. 13 presents an upper isometric view of two dollies as shown in FIG. 1 being hitched to a dolly as shown in FIG. 5.

Referring now specifically to FIGS. 10 and 12 which show that the pivoting mechanism 130 is configured to bias the tow bar 120 to an upright position about a horizontal axis transversal to the main traveling direction of the dolly 100. More specifically, the swing member 136 is biased toward the horizontal position by means of a biasing spring 134 arranged around the axle 131 between the swing member 136 and the guide block 150. With aid of the biasing spring the tow bar 120 is suspended such to create a tendency to pivot to the vertical position in order to aid the hitch coupling 121 at the distal end of the tow bar 120 to remain in contact with the cooperating hitch 190 (FIG. 13). It is to be noted that the additional hitch seen in FIG. 10, for example, is not intended to couple to a hitch coupling 121 as seen on the tow bar 120 but to another coupling outside the scope of the present invention.

The biasing spring 134 has an additional function. Once the tow bar 120 has been slid into the retracted position (cf. FIGS. 2 and 4), the tow bar is biased upward, wherein the opening, i.e. the hitch coupling 121, in the distal end of the tow bar 120 engages with a corresponding locking means 114 of the chassis 100. The locking means 114 may, for example, be a protruding screw head of a screw used in the assembly of the chassis. The cooperation between the locking means 114 and the hitch coupling 121 is best shown in FIG. 4.

The pivoting mechanism 130 further includes an angle limiting spring 133 which takes the form of an elastic conical stopper which protrudes orthogonally from the swing member 136 toward the second end 102 or guide block 150 of the dolly 100 depending on the angular position of the swing member 136. The angle limiting spring 133 is configured to engage with the guide block 150 when the swing member 136 and particularly the tow bar 120 is pivoted into the horizontal position (cf. FIG. 8). Once the angle limiting spring 133 has made contact with the guide block 150, the angle of the tow bar 120 around the axle 131 and in respect to the chassis 100 is limited. Due to the compression elasticity of the angle limiting spring 133, the terminal end of the tow bar 120 may be pressed downwards in order to fit the hitch coupling 121 to the cooperating hitch 190 (FIG. 13). This downward orienting force on the tow bar side of the axle 131 is inverted into an upward orienting force at the angle limiting spring 133 on the opposite side of the axle 131, wherein the angle limiting spring 133 compresses elastically thus providing suspended angular latitude for the tow bar 120. The same function is used in on the one hand locking the hitch coupling 121 to the locking means 114 of the chassis 100 and on the other hand for releasing the hitch coupling 121 from the locking means 114 (cf. FIG. 4).

Thus, while there have been shown and described and pointed out fundamental novel features of the invention as applied to a preferred embodiment thereof, it will be understood that various omissions and substitutions and changes in the form and details of the method and device may be made by those skilled in the art without departing from the spirit of the invention. For example, it is expressly intended that all combinations of those elements which perform substantially the same results are within the scope of the invention. Substitutions of the elements from one described embodiment to another are also fully intended and contemplated. It is also to be understood that the drawings are not necessarily drawn to scale but they are merely conceptual in nature. It is the intention, therefore, to be limited only as indicated by the scope of the claims appended hereto.

We claim:

1. A dolly for transporting items loaded thereon, the dolly comprising:
   a chassis having an upper side comprising a load carrying surface for receiving the items, and an underside opposing the upper side,
   a guide track on the underside of the dolly,
   a guide block slidably arranged on the guide track,
   a tow bar arranged slidably to the underside of the chassis via a pivoting mechanism, which pivotally connects the tow bar to the guide block, where the pivoting mechanism is configured to be moved along the guide track and to bias the tow bar towards an upright position about a horizontal axis transverse to the main traveling direction of the dolly,
   a first hitch member provided to a terminal end of the tow bar, and a corresponding second hitch member, the first hitch member and the second hitch member configured to selectively provide a hitch coupling between the dolly and another such dolly, where the hitch coupling opposes the bias of the pivoting mechanism, and
   a swing member associated with the tow bar and located below the guide block, such that the pivoting mechanism swings the swing member about an axis of rotation of the tow bar.

2. The dolly according to claim 1, wherein the dolly comprises a first end and a second end opposing the first end, wherein the tow bar is configured to be moved between:
   a towing position, wherein the tow bar is exposed at the first end in a substantially horizontal position,
   a parking position, wherein the tow bar is exposed at the first end in a substantially vertical position, and
   a retracted position, wherein the tow bar is retracted from the first end towards the second end and covered by the load carrying surface.

3. The dolly according to claim 1, wherein the guide track comprises two opposing profiles at a distance from one another, the distance extending in a direction transverse to the main traveling direction of the dolly, wherein the guide block is arranged to run between the two opposing profiles of the guide track.

4. The dolly according to claim 1, wherein the guide track is formed with a unitary profile, the inner surface of which is shaped to receive the guide block and the outer surface of which is adapted to provide a protective enclosure for the tow bar assembly including the tow bar, pivoting mechanism, and the guide block.

5. The dolly according to claim 1, wherein the tow bar extends from the swing member so as to allow the tow bar to be pivoted about the horizontal axis located below the guide block.

6. The dolly according to claim 5, wherein the pivoting mechanism comprises a biasing spring arranged around the horizontal axis, and which biases the swing member toward the upright position.

7. The dolly according to claim 1, wherein the dolly comprises a locking mechanism including:
   a first locking interface arranged to the swing member and
   a second locking interface provided to the chassis, the second locking interface configured to engage with the cooperating first locking interface of the swing member of the pivoting mechanism,
   wherein the locking mechanism is configured to lock the guide block to the chassis when the tow bar is pivoted into a substantially horizontal towing position.

8. The dolly according to claim 7, wherein the chassis and swing member comprise cooperating counterpart forms for forming the second locking interface and the first locking interface, respectively.

9. The dolly according to claim 7, wherein the first locking interface comprises at least one protrusion extending from the swing member and the second locking interface is a cooperating at least one receptive opening in the chassis.

10. The dolly according to claim 7, wherein at least one receptive opening is provided to a locking plate, which is provided to the first end of the dolly on top of the guide track.

11. A dolly for transporting items loaded thereon, the dolly comprising:
   a chassis having an upper side comprising a load carrying surface for receiving the items, and an underside opposing the upper side,
   a guide track on the underside of the dolly,
   a guide block slidably arranged on the guide track, a tow bar arranged slidably to the underside of the chassis via a pivoting mechanism, which pivotally connects the tow bar to the guide block, where the pivoting mechanism is configured to be moved along the guide track and to bias the tow bar towards an upright position about a horizontal axis transverse to the main traveling direction of the dolly, a first hitch member provided to a terminal end of the tow bar, and a corresponding second hitch member, the first hitch member and the second hitch member configured to selectively provide a hitch coupling between the dolly and another such dolly, for where the hitch coupling opposes the bias of the pivoting mechanism, an axle, which is fixed to the guide block for forming the axis of revolution of the tow bar, a swing member arranged rotatably around the axle and connected to the tow bar such that the tow bar extends from the swing member so as to allow the tow bar to be pivoted about the axle, and a locking mechanism configured to lock the guide block to the chassis when the tow bar is pivoted into a substantially horizontal towing position, the locking mechanism comprising a first locking interface arranged to the swing member and a second locking interface provided to the chassis, the second locking interface configured to engage the cooperating first locking interface of the swing member.

12. The dolly according to claim 11, wherein the chassis and swing member comprise cooperating counterpart forms for forming the second locking interface and the first locking interface, respectively.

13. The dolly according to claim 11, wherein the first locking interface comprises at least one protrusion extending from the swing member and the second locking interface is a cooperating at least one receptive opening in the chassis.

14. The dolly according to claim 11, wherein at least one receptive opening is provided to a locking plate, which is provided to the first end of the dolly on top of the guide track.

* * * * *